Patented Jan. 8, 1929.

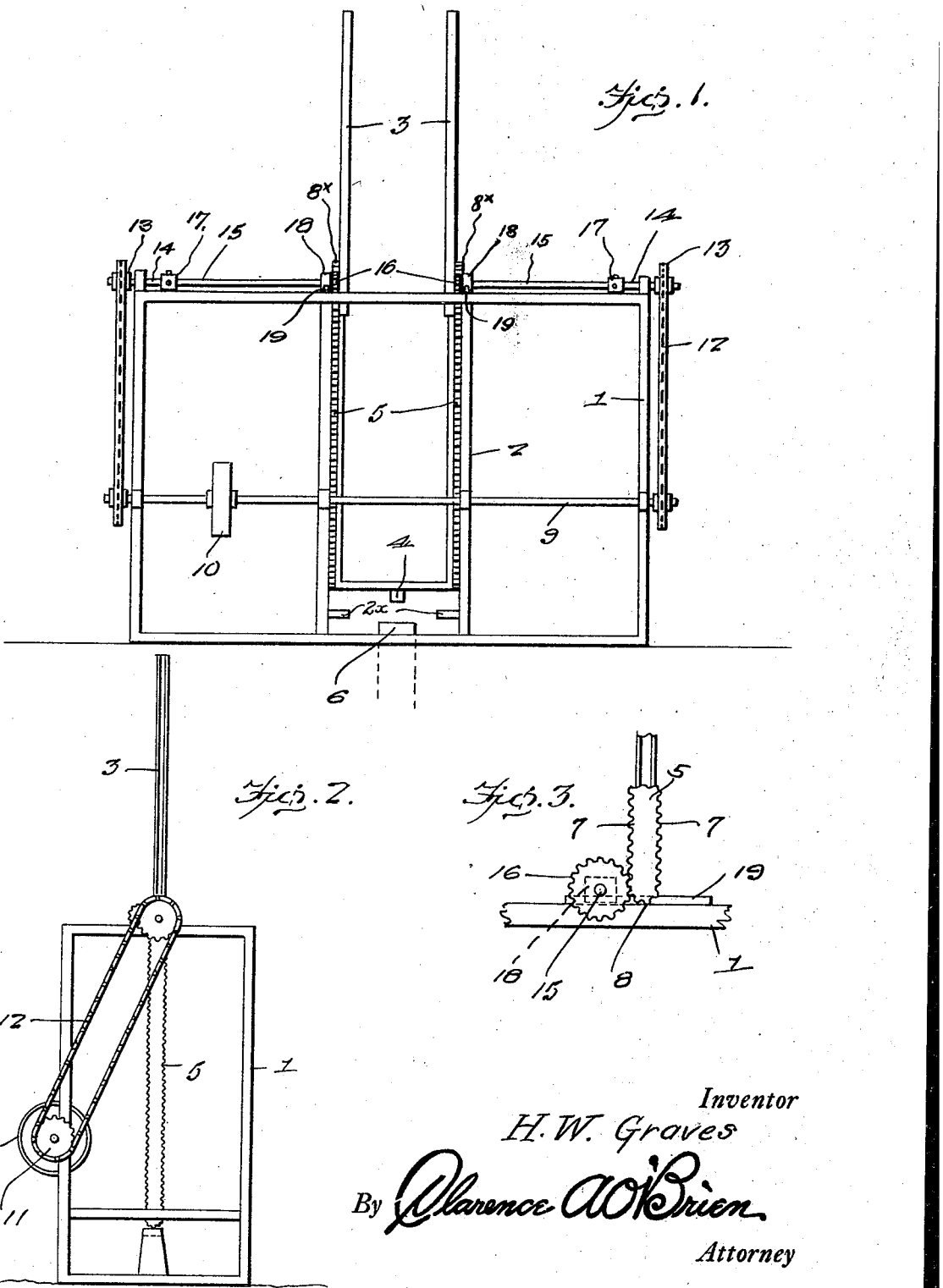

1,698,130

UNITED STATES PATENT OFFICE.

HERSCHEL WALTER GRAVES, OF LOST HILLS, CALIFORNIA.

LONG-STROKE PUMPING MECHANISM.

Application filed January 15, 1926. Serial No. 81,433.

My present invention pertains to pumping mechanism, and has for its general object the provision of an efficient and reliable operating mechanism of long stroke type designed more particularly for oil well purposes.

To the attainment of the foregoing, the invention consists in the improvement as hereinafter described and definitely claimed.

In the accompanying drawings, forming part of this specification:—

Figure 1 is an elevation of the mechanism constituting the preferred embodiment of my invention.

Figure 2 is an end elevation—i. e., an elevation at right angles to Figure 1.

Figure 3 is a fragmentary elevation of a detail constituting an important part of my invention and hereinafter explicitly referred to.

Similar numerals of reference designate corresponding parts in all of the views of the drawings.

I show in Figures 1 and 2, a main frame 1 which may be of the construction illustrated or of any other construction compatible with the purpose of my invention. Fixed with respect to the frame 1 are appropriate guides 2 for the rectilinearly movable element 3 of my improvement, the said element 3 being equipped at 4 with appropriate means for the connection of a pump rod (not shown), and the member 3 in the present and preferred embodiment of my invention being provided with two racks 5 spaced apart and arranged in parallelism, Figure 1. At 6 in Figure 1, I illustrate a pump cylinder or casing to make clear the arrangement of the novel mechanism relative to the said cylinder or casing.

The guides 2 are provided at $2^x$ with stops for limiting the longitudinal downward movement of the member 3 by which the racks 5 are carried.

As will be readily understood by comparison of Figures 1 and 3, the racks 5 are of duplex type, that is to say, each rack 5 has teeth on its opposite edges as designated by 7 in Figure 3, and it will also be noticed that the two sets of teeth 7 of each rack 5 are continuous with corresponding teeth 8 at the lower end and corresponding teeth $8^x$ at the upper end of the rack.

Journaled in appropriate bearings on the main frame 1 is a drive shaft 9 adapted to be appropriately connected at 10 with any motor for the operation of my novel mechanism. The shaft 9 is equipped with sprocket gears 11, and the said sprocket gears 11 are connected through the medium of sprocket belts 12 with sprocket gears 13 fixed on shafts 14 mounted on the frame 1. At 15 are shafts equipped with spur gears 16 in mesh with the racks 5. Universal joints 17 or other appropriate connections are interposed between the shafts 14 and 15 so as to permit oscillatory movement in a horizontal plane of the shafts 15, the inner portions of the shafts 15 being journaled in slides 18 movable rectilinearly on or in appropriate guides 19 on the frame 1. Manifestly when the member 3 is moved upwardly by rotation of the spur gears 16, the spur gears 16 will at the completion of the upward traverse of the member 3 travel under the lower ends of the racks 5, after which the continued rotation of the spur gears 16 will bring about downward movement of the member 3, and when the member 3 is moved downwardly by rotation of the spur gears 16, the spur gears 16 will at the completion of the downward traverse of the member 3 travel over the upper ends of the racks 5 after which the continued rotation of the spur gears 16 will bring about upward movement of the member 3. The said reversible capacity of my improvement is due to the adaptability of the spur gears 16 to first engage the teeth 7 at one side of the racks 5, and then engage the end teeth 8 $8^x$ of the racks, and then the teeth 7 on the opposite edges of the racks. In other words the gears 16 are adapted to move below the ends of the racks 5 while engaging the end teeth 8, and above the ends the racks 5 while engaging the end teeth $8^x$, and from one set of teeth 7 to the other, the engagement of the spur gears 16 with the end teeth of the racks 5 serving to move the shafts 15 laterally.

When once put in operation, my novel organized mechanism requires little if any attention from an attendant, and it will also be manifest that through the medium of the means described long strokes are transmitted to the member 3 and the capacity of the organized mechanism as a whole is increased.

Notwithstanding the practical advantages ascribed to my novel long stroke pumping mechanism, it will be apparent that the mechanism is simple and inexpensive in construction, and as a whole is well adapted to withstand the rough usage and exposure to which mechanisms of corresponding character are ordinarily subjected.

I have specifically described the construction and relative arrangement of the parts in the present and preferred embodiment of my invention in order to impart an exact understanding of said embodiment. I do not desire, however, to be understood as confining myself to the structure illustrated and described, my invention being defined by my appended claim within the scope of which structural changes and changes in arrangement may be made without departure from my invention.

Having described my invention, what I claim and desire to secure by Letters-Patent, is:—

In an organized stroke mechanism, a frame, a rectilinearly movable and reciprocatory member guided in said frame and having rod like racks in parallelism, each rack having a longitudinal set of outwardly directed teeth at one side, a longitudinal set of outwardly directed teeth at an opposite side, and end sets of outwardly directed teeth intermediate of adjacent ends of the longitudinal sets of teeth, oscillatory shafts mounted on the frame at opposite sides of the rectilinearly movable and reciprocatory member and movable in a plane at right angles to the line of movment of said member, guides for said shafts, and spur gears carried by said shafts and meshed with the teeth of the reciprocatory member; the frame being provided with means to limit the downward movement of the reciprocatory member.

In testimony whereof I affix my signature.

HERSCHEL W. GRAVES.